July 17, 1962     C. CUEPPERS ETAL     3,044,348
HAIDINGER'S BRUSH ATTACHMENT FOR SYNOPTOPHORE APPARATUS
Filed Sept. 26, 1958

INVENTORS
Curt Cueppers &
Kurt Kirchuebel
By
Watson, Cole, Grindle & Watson
Attorneys United States Patent Office 3,044,348
Patented July 17, 1962

3,044,348
HAIDINGER'S BRUSH ATTACHMENT FOR
SYNOPTOPHORE APPARATUS
Curt Cueppers, 31 Wartweg, Giessen, Germany, and
Kurt Kirchhuebel, Dutenhofen, near Wetzlar, Germany
Filed Sept. 26, 1958, Ser. No. 763,515
Claims priority, application Germany Oct. 2, 1957
2 Claims. (Cl. 88—20)

The invention relates to synoptophoric apparatus, i.e. to apparatus which are employed inter alia to measure the angle of strabism and to restore binocular vision.

In both of these cases, i.e., not only for the purpose of measurement but also in effecting treatment, it is essential that the image presented to the eye should be perceived by the fovea of the eye, that is to say, by the correct centre of vision, and not in any way by a centre of vision which is acquired subsequently. There is no means of ensuring this in the case of images as presented heretofore. To achieve such a condition it is the object of the invention to provide an ancillary device in conjunction with synoptophoric apparatus, by means of which there is presented to the eye being examined an image which can be perceived by the fovea alone.

According to the invention an ancillary device capable of attachment to a synoptophoric apparatus includes an arrangement by means of which a rotary Haidinger's brush may be presented to the eye. It comprises in substance a light source, a rotatably mounted polarising filter, which is rotated at a rate of approximately one to three revolutions per second, and also a blue filter.

A Haidinger's brush, for example, is perceptible for a brief space of time when a blue sky is viewed through a polarising filter. If, however, the filter is rotated, the brush follows its movement, and may be perceived continuously. This brush results only in the fovea, and it may, therefore, be observed only by the fovea. In this way there is obtained a characteristic of the fovea in space.

The ancillary device is preferably so mounted on the synoptophoric apparatus that the Haidinger's brush will appear. This has the advantage that in the synoptophore transparent, images may be fitted and may be viewed together with the brush.

Figure 1:
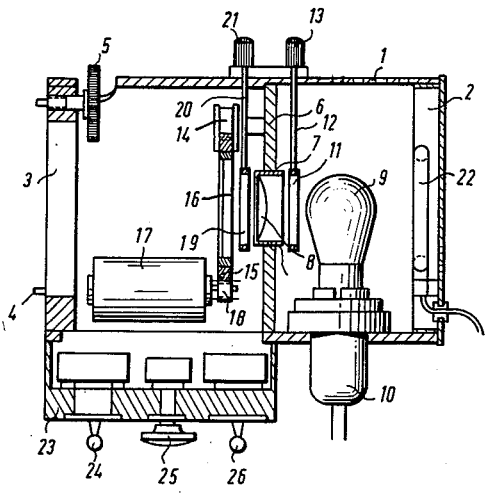
Figure 2:
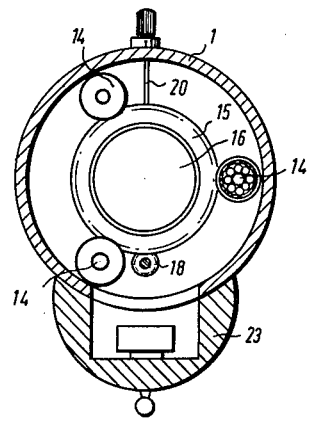

An embodiment of the invention is illustrated by way of example in the accompanying drawing, in which
FIG. 1 is a section taken through the ancillary device,
FIG. 2 being a section at right angles to FIG. 1.

The tubular casing of the ancillary device is shown at 1. It is closed towards the rear by a detachable cover member 2 and carries at the front an annular plate 3 having centering studs 4 and an attachment screw 5. The studs 4 and the screw 5 serve for centering of the device and for attachment thereof to the synoptophoric apparatus as for instance shown in U.S. Patent No. 2,855,821, dated October 14, 1958. The casing 1 is divided by means of a partition 6. The latter possesses at the centre thereof a short cylindrical portion 7 carrying a condenser lens 8. In the rear half of the casing 1 there is provided an incandescent lamp 9 having a mounting 10. Between the lens 8 and the lamp 9 is located a piece of opal glass 11. Its mounting is secured to a rod 12, which may be drawn upwardly by means of a knob 13.

On the front wall of the partition 6 there are provided three rollers 14 mounted on ball bearings. These serve to guide a toothed rim 15, which at the same time acts as mounting for a polarising filter 16. The toothed rim is driven by a motor 17 provided with a pinion 18. The filter 16 is rotated at a speed of from one to three revolutions per second. Between the filter 16 and the lens 8 there is provided a blue filter 19, the mounting in respect of which is secured to a rod 20 and may be withdrawn upwardly by means of a knob 21.

In the cover member 2 there is provided an electronic flash device 22. The object of this is to create afterimages in the eye.

A small casing portion 23 is secured to the casing 1. This accommodates the switches 24 to 26, by which there may be switched on the motor 17, the lamp 9 and the electronic flash device.

What we claim is:
1. An auxiliary device to be attached to a synoptophore comprising a casing having a closed rear side and a front side in the form of an annular plate with centering studs and an attaching screw, a partition in the casing having a condenser lens carried thereby, an incandescent lamp mounted in the rear part of the casing, a piece of opal glass mounted and supported from a rod and located between the said condenser lens and the lamp, a knob on the outer end of the rod to draw the opal glass upwardly, a plurality of rollers mounted on the partition on a front wall thereof, a toothed rim guided by and on the rollers, a polarizing filter mounted in the toothed rim, a motor in the casing connected to drive the rim by means of a pinion, a blue filter mounted by means of a rod in the casing and operable by a knob, and an electronic flash device mounted in the back of the casing.

2. An auxiliary device according to claim 1, in which a small casing portion is secured to the first-mentioned casing to accommodate the electric devices connected to control the motor, the lamp and the electronic flash device.

References Cited in the file of this patent

Helmholtz text, Physiological Optics, (Southall translation), volume II. The Optical Society of America, 1924. Pages 301–308.

Goldschmidt article in American Journal of Ophthalmology, vol. 27, No. 12 (December 1944). Pages 1439–40.

"American Journal of Ophthalmology," vol. 27, No. 12, Dec. 1944, pages 1439 and 1440 cited.